United States Patent
Jiang

(10) Patent No.: US 11,923,912 B2
(45) Date of Patent: Mar. 5, 2024

(54) MEASUREMENT METHOD AND DEVICE

(71) Applicant: VIVO MOBILE COMMUNICATION CO., LTD., Guangdong (CN)

(72) Inventor: Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 414 days.

(21) Appl. No.: 17/174,670

(22) Filed: Feb. 12, 2021

(65) Prior Publication Data

US 2021/0167874 A1     Jun. 3, 2021

Related U.S. Application Data

(63) Continuation of application No. PCT/CN2019/099345, filed on Aug. 6, 2019.

(30) Foreign Application Priority Data

Aug. 17, 2018   (CN) .......................... 201810943460.6

(51) Int. Cl.
    *H04B 17/27*        (2015.01)
    *H04B 17/327*      (2015.01)
    (Continued)

(52) U.S. Cl.
    CPC ............ *H04B 17/27* (2015.01); *H04B 17/327* (2015.01); *H04W 24/10* (2013.01); *H04W 76/27* (2018.02); *H04W 76/28* (2018.02)

(58) Field of Classification Search
    CPC ..... H04B 17/27; H04B 17/327; H04W 76/28; H04W 76/27; H04W 24/10
    (Continued)

(56) References Cited

U.S. PATENT DOCUMENTS 8,798,683 B2 * 8/2014 Wilson ................ H04W 72/542
                                                           370/278
9,918,271 B2 * 3/2018 Yang ..................... H04W 36/08
(Continued)

FOREIGN PATENT DOCUMENTS

CN         102137424 A      7/2011
CN         103108333 A      5/2013
(Continued)

OTHER PUBLICATIONS

International Search Report and Written Opinion of the International Searching Authority regarding International Patent Application No. PCT/CN2019/099345, dated Oct. 28, 2019. Translation provided by Bohui Intellectual Property.

(Continued)

*Primary Examiner* — Mong-Thuy T Tran
(74) *Attorney, Agent, or Firm* — Harness, Dickey & Pierce, P.L.C.

(57) ABSTRACT

A measurement method includes: determining first information, where the first information includes at least one of the following: a measurement quantity of a cell in which a terminal device is located that is obtained by the terminal device through measurement and information related to a movement velocity of the terminal device, where the measurement quantity indicates at least one of SINR, RSRP, and RSRQ; and determining a measurement periodicity based on the first information and a first correspondence, where the first correspondence indicates that the measurement periodicity is related to at least one of the measurement quantity and the movement velocity.

17 Claims, 6 Drawing Sheets

(51) Int. Cl.
*H04W 24/10* (2009.01)
*H04W 76/27* (2018.01)
*H04W 76/28* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 10,313,959 | B2* | 6/2019 | Jeong | H04W 48/08 |
| 10,819,450 | B2* | 10/2020 | Ku | H04W 24/08 |
| 11,742,915 | B2* | 8/2023 | Yang | H04B 7/0626 |
| | | | | 370/329 |
| 11,758,585 | B2* | 9/2023 | Da Silva | H04W 36/0055 |
| | | | | 370/329 |
| 2013/0072200 | A1* | 3/2013 | Yu | H04W 24/10 |
| | | | | 455/456.1 |
| 2013/0178213 | A1 | 7/2013 | Li | |
| 2013/0194954 | A1 | 8/2013 | Dalsgaard et al. | |
| 2015/0181450 | A1 | 6/2015 | Xin et al. | |
| 2016/0212642 | A1* | 7/2016 | Ljung | H04W 76/28 |
| 2017/0048772 | A1* | 2/2017 | Gheorghiu | H04W 36/14 |
| 2018/0220349 | A1* | 8/2018 | Watanabe | H04W 76/18 |
| 2018/0242208 | A1* | 8/2018 | Ku | H04W 48/20 |
| 2018/0270688 | A1* | 9/2018 | Jung | H04B 17/345 |
| 2019/0021020 | A1* | 1/2019 | Kim | H04W 52/0229 |
| 2019/0053087 | A1* | 2/2019 | Callender | H04L 1/0017 |
| 2019/0357112 | A1* | 11/2019 | Shen | H04W 36/00837 |
| 2020/0015280 | A1* | 1/2020 | Fujishiro | H04W 16/26 |
| 2020/0033849 | A1* | 1/2020 | Yiu | G05D 1/0022 |
| 2021/0120562 | A1* | 4/2021 | Xu | H04W 72/541 |
| 2023/0156441 | A1* | 5/2023 | Lee | H04W 8/005 |
| | | | | 370/329 |

FOREIGN PATENT DOCUMENTS

| | | | |
|---|---|---|---|
| WO | WO-2017135684 A1 | 8/2017 | |
| WO | WO-2017167918 A1 * | 10/2017 | ............ H04B 17/336 |

OTHER PUBLICATIONS

Huawei, et al., "New WI proposal: High speed train support with LTE," 3GPP TSG-RAN WG4 Meeting #86Bis, R4-1804778, Apr. 16-20, 2018.

First Office Action regarding Chinese Patent Application No. 201810943460.6, dated Sep. 24, 2020. Translation provided by Bohui Intellectual Property.

Huawei, et al., "Further discussion on enhanced RRM requirements in idle mode under high speed scenario," 3GPP TSG-RAN WG4 Meeting #80 R4-165988, Aug. 22-26, 2016.

Ericsson, "RRM requirements for RRC connected mode in high speed scenarios," 3GPP TSG-RAN WG4 Meeting #78bis R4-161722, Apr. 15, 2016.

Supplementary European Search Report regarding Patent Application No. 19849956.8-1212/ 3840457, PCT/CN2019/099345, dated Oct. 6, 2021.

* cited by examiner

MEASUREMENT METHOD AND DEVICE

CROSS-REFERENCE TO RELATED APPLICATIONS

This application is a Bypass Continuation Application of PCT/CN2019/099345 filed on Aug. 6, 2019, which claims priority to Chinese Patent Application No. 201810943460.6 filed on Aug. 17, 2018, which are incorporated herein by reference in their entirety.

TECHNICAL FIELD

Embodiments of this disclosure relate to the field of communications technologies, and specifically, to a measurement method and a device.

BACKGROUND

In the new radio (New Radio, NR) release 15 (Release 15, R15) standard, terminal devices are required to measure synchronization signal (Synchronization Signal, SS)-reference signal received power (Reference Signal Received Power, RSRP) and SS-reference signal received quality (Reference Signal Received Quality, RSRQ) of a serving cell and evaluate the cell selection S criterion, in at least every discontinuous reception (Discontinuous Reception, DRX) cycle.

The current standard requires a terminal device to measure SS-RSRP and SS-RSRQ of an identified intra-frequency cell at least once at each measurement time (for example, $T_{measure, NR\_Intra}$) according to the measurement rule.

In the current measurement method, because only the measurement periodicity or measurement time is considered, the terminal device may perform excessive measurements, resulting in increased energy consumption of the terminal device.

SUMMARY

According to a first aspect, an embodiment of this disclosure provides a measurement method, applied to a terminal device, where the method includes:
  determining first information, where the first information includes at least one of the following: a measurement quantity of a cell in which the terminal device is located that is obtained by the terminal device through measurement and information related to a movement velocity of the terminal device, where the measurement quantity indicates at least one of signal-to-noise ratio SINR, reference signal received power RSRP, and reference signal received quality RSRQ; and
  determining a measurement periodicity based on the first information and a first correspondence, where the first correspondence indicates that the measurement periodicity is related to at least one of the measurement quantity and the movement velocity.

According to a second aspect, an embodiment of this disclosure provides a measurement method, applied to a network device, where the method includes:
  sending a first correspondence to a terminal device, so that the terminal device determines a measurement periodicity based on the first correspondence and first information, where
  the first information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and
  the first correspondence indicates that the measurement periodicity is related to at least one of the measurement quantity and the movement velocity.

According to a third aspect, an embodiment of this disclosure provides a measurement method, applied to a terminal device, where the method includes:
  determining second information, where the second information includes at least one of the following: a measurement quantity of a cell in which the terminal device is located that is obtained by the terminal device through measurement, and information related to a movement velocity of the terminal device, where the measurement quantity indicates at least one of SINR, RSRP, and RSRQ;
  determining an intra-frequency or inter-frequency measurement time based on the second information and a second correspondence, where the second correspondence indicates that the intra-frequency or inter-frequency measurement time is related to at least one of the measurement quantity and the movement velocity, and
  measuring a measurement quantity of an identified intra-frequency cell or inter-frequency cell based on the intra-frequency or inter-frequency measurement time.

According to a fourth aspect, an embodiment of this disclosure provides a measurement method, applied to a network device, where the method includes:
  sending a second correspondence to a terminal device, so that the terminal device determines an intra-frequency or inter-frequency measurement time based on second information and the second correspondence, where
  the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and
  the second correspondence indicates that the intra-frequency or inter-frequency measurement time is related to at least one of the measurement quantity and the movement velocity.

According to a fifth aspect, an embodiment of this disclosure further provides a terminal device, including:
  a first determining module, configured to determine first information, where the first information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and
  a second determining module, configured to determine a measurement periodicity based on the first information and a first correspondence, where the first correspondence indicates that the measurement periodicity is related to at least one of the measurement quantity and the movement velocity.

According to a sixth aspect, an embodiment of this disclosure further provides a network device, including:
  a first sending module, configured to send a first correspondence to a terminal device, so that the terminal device determines a measurement periodicity based on the first correspondence and first information, where the first information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and the first correspondence indicates that the measurement periodicity is related to at least one of the measurement quantity and the movement velocity.

According to a seventh aspect, an embodiment of this disclosure further provides a terminal device, including:

a third determining module, configured to determine second information, where the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ;

a fourth determining module, configured to determine an intra-frequency or inter-frequency measurement time based on the second information and a second correspondence, where the second correspondence indicates that the intra-frequency or inter-frequency measurement time is related to at least one of the measurement quantity and the movement velocity, and a measurement module, configured to measure a measurement quantity of an identified intra-frequency cell or inter-frequency cell based on the intra-frequency or inter-frequency measurement time.

According to an eighth aspect, an embodiment of this disclosure further provides a network device, including:

a second sending module, configured to send a second correspondence to a terminal device, so that the terminal device determines an intra-frequency or inter-frequency measurement time based on second information and the second correspondence, where the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and the second correspondence indicates that the intra-frequency or inter-frequency measurement time is related to at least one of the measurement quantity and the movement velocity.

According to a ninth aspect, an embodiment of this disclosure provides a terminal device, including a processor, a memory, and a computer program stored in the memory and capable of running on the processor, where when the computer program is executed by the processor, the steps of the foregoing measurement method in the first or the third aspect are implemented.

According to a tenth aspect, an embodiment of this disclosure further provides a network device, including a processor, a memory, and a computer program stored in the memory and capable of running on the processor, where when the computer program is executed by the processor, the steps of the foregoing measurement method in the second or fourth aspect are implemented.

According to an eleventh aspect, an embodiment of this disclosure further provides a computer-readable storage medium, where the computer-readable storage medium stores a computer program, and when the computer program is executed by a processor, the steps of the foregoing measurement method are implemented.

BRIEF DESCRIPTION OF DRAWINGS

Other advantages and benefits will become apparent to those of ordinary skill in the art by reading detailed description of the optional embodiments below. The accompanying drawings are merely intended to illustrate the objectives of the optional embodiments and are not intended to limit this disclosure. Throughout the accompanying drawings, the same reference numerals represent the same components. In the drawings.

DESCRIPTION OF EMBODIMENTS

Figure 1:
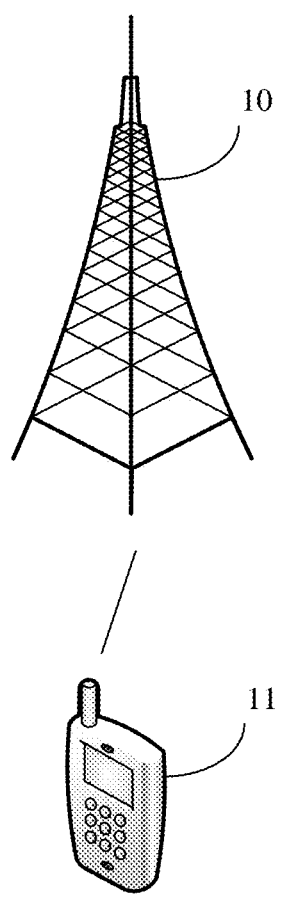
FIG. 1 is a schematic architectural diagram of a wireless communications system according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In the embodiments of this disclosure, terms such as "exemplary" or "for example" are used to represent giving an example, an instance, or an illustration. Any embodiment or design solution described as "exemplary" or "for example" in the embodiments of this disclosure should not be construed as being more preferred or advantageous than other embodiments or design solutions. Exactly, use of the terms such as "exemplary" or "for example" is intended to present a related concept in a specific manner.

The technologies described herein are not limited to long term evolution (Long Term Evolution, LTE)/LTE-Advanced (LTE-Advanced, LTE-A) systems, and may also be used in various wireless communications systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems.

The terms "system" and "network" are often used interchangeably. The CDMA system can implement radio technologies such as CDMA2000 and universal terrestrial radio access (Universal Terrestrial Radio Access, UTRA). UTRA includes wideband CDMA (Wideband Code Division Multiple Access, WCDMA) and other CDMA variants. The TDMA system can implement radio technologies such as the global system for mobile communication (Global System for Mobile Communication, GSM). The OFDMA system can implement radio technologies such as ultra mobile broadband (Ultra Mobile Broadband, UMB), evolved-UTRA (Evolved-UTRA, E-UTRA), IEEE 802.11 (Wi-Fi), IEEE 802.16 (WiMAX), IEEE 802.20, and Flash-OFDM. UTRA and E-UTRA are both part of the universal mobile telecommunications system (Universal Mobile Telecommunications System, UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3rd Generation Partnership Project, 3GPP). CDMA2000 and UMB are described in documents from an organization named "3rd Generation Partnership Project 2" (3GPP2). The techniques described in this specification can be used for the systems and radio technologies mentioned above, as well as other systems and radio technologies.

For ease of understanding of the embodiments of this disclosure, several techniques are introduced first:

I. Measurement and Evaluation of Serving Cell (Measurement and Evaluation of Serving Cell):

A terminal device is required to measure the SS-RSRP (Synchronous RSRP for short) and SS-RSRQ of a serving cell at least in each DRX cycle, and to evaluate the cell selection S criterion for the serving cell.

If the terminal device evaluates, for $N_{serv}$ consecutive DRX cycles, that all serving cells fail to meet the S criterion for cell selection, a current rule that restricts measurement activities of the terminal device may not be considered, and the terminal device starts to measure all neighboring cells as indicated by the serving cell.

The technical specification specifies the values of $N_{serv}$ under different DRX cycles. For details, see Table 1.

TABLE 1

| $N_{serv}$ | |
|---|---|
| DRX cycle length (DRX cycle length) [s] | $N_{serv}$ [number of DRX cycles] ([number of DRX cycles]) |
| 0.32 | [4] |
| 0.64 | [4] |
| 1.28 | [2] |
| 2.56 | [2] |

II. Measurements of Intra-Frequency or Inter-Frequency NR Cells (Measurements of Intra-Frequency/Inter-Frequency NR Cells):

In idle mode, a terminal device is required to be able to identify a new detectable cell if the terminal device has no intra-frequency cell list containing specific physical-layer cell identities (Identity, ID). Detection time requirements for intra-frequency and inter-frequency cells are the same, and the value of the detection time ($T_{detect, NR\_Intra}$) varies according to the number of DRX cycles.

The terminal device measures SS-RSRP and SS-RSRQ of an identified intra-frequency cell at least once at each measurement time ($T_{measure, NR\_Intra}$) according to a measurement rule. SS stands for synchronization signal (Synchronization Signal).

When a signal of an intra-frequency cell is at least [3] dB stronger than that of a serving cell, the terminal device needs to be able to evaluate, within the evaluation time ($T_{evaluate, NR\_intra}$), that the intra-frequency cell meets the cell reselection criterion defined by radio access network 2 (Radio Access Network 2, RAN2), where the evaluation time ($T_{evaluate, NR\_intra}$) varies with the number of DRX cycles.

TABLE 2

Detection time ($T_{detect, NR\_Intra}$), measurement time ($T_{measure, NR\_Intra}$) and evaluation time ($T_{evaluate, NR\_intra}$).

| DRX cycle length [s] | Detection time [s] (number of DRX cycles) | Measurement time [s] (number of DRX cycles) | Evaluation time [s] (number of DRX cycles) |
|---|---|---|---|
| 0.32 | 11.52 × N1 (36 × N1) | 1.28 × N1 (4 × N1) | 5.12 × N1 (16 × N1) |
| 0.64 | 17.92 × N1 (28 × N1) | 1.28 × N1 (2 × N1) | 5.12 × N1 (8 × N1) |
| 1.28 | 32 × N1 (25 × N1) | 1.28 × N1 (1 × N1) | 6.4 × N1 (5 × N1) |
| 2.56 | 33.28 × N1 (23 × N1) | 2.56 × N1 (1 × N1) | 7.68 × N1 (3 × N1) |

Note:
For a frequency range 1 (frequency range 1), N1 = 1; and for a frequency range 2 (frequency range 2), the value of N1 is to be determined.

NR R15 requires a terminal device to measure SS-RSRP and SS-RSRQ of a serving cell at least in each DRX cycle, and evaluate the cell selection S criterion for the serving cell.

The current standard requires a terminal device to measure SS-RSRP and SS-RSRQ of an identified intra-frequency cell at least once at each measurement time ($T_{measure, NR\_Intra}$) according to a measurement rule.

The current standard supports measurement relaxation for a terminal device with low mobility ((low mobility), that is, a low movement velocity, for example, movement velocity≤3 km/h). For example, the measurement is relaxed to measuring SS-RSRP and SS-RSRQ of a serving cell once every N DRX cycles. For a low-mobility terminal device, it is assumed that a movement velocity is 3 km/h and a movement distance is 8.53 m in 10.24 s.

For a terminal device with good RSRP, for example, a terminal device in a center of a cell, after the terminal device moves for 8.53 m, it is highly probable that the RSRP is still good, meaning that the terminal device has a low probability of cell reselection. In this case, RRM measurement may be relaxed to measuring SS-RSRP and SS-RSRQ of a serving cell once every more DRX cycles. Conversely, for a terminal device with poor RSRP, for example, a terminal device at an edge of a cell, RRM measurement may be measuring SS-RSRP and SS-RSRQ of a serving cell once every fewer DRX cycles. However, the current standard does not support this feature.

The following describes the embodiments of this disclosure with reference to the accompanying drawings. The measurement method and the device provided in the embodiments of this disclosure may be applied into a wireless communications system. FIG. 1 is a schematic architectural diagram of a wireless communications system according to an embodiment of this disclosure. As shown in FIG. 1, the wireless communications system may include: a network device 10 and a terminal device. The terminal device is denoted as user equipment (User Equipment, UE) 11. The UE 11 may communicate with the network device 10 (transmission of signaling or data). In practical applications, the connection between the above devices may be a wireless connection. For ease of visually representing the connection relationship between the devices, a solid line is used for illustration in FIG. 1. It should be noted that the foregoing communications system may include a plurality of UEs 11, and that the network device 10 may communicate with a plurality of UEs 11.

The terminal device provided in this embodiment of this disclosure may be a mobile phone, a tablet computer, a notebook computer, an ultra-mobile personal computer (Ultra-mobile Personal Computer, UMPC), a netbook, a personal digital assistant (Personal Digital Assistant, PDA), a mobile internet device (Mobile Internet Device, MID), a wearable device (Wearable Device), a vehicle-mounted device, or the like.

The network device 10 provided in this embodiment of this disclosure may be a base station. The base station may be a commonly used base station or an evolved node base station (evolved node base station, eNB), or may be a network device in a 5G system (for example, a next generation node base station (next generation node base station, gNB), a transmission and reception point (transmission and reception point, TRP)), or the like.

Figure 2:
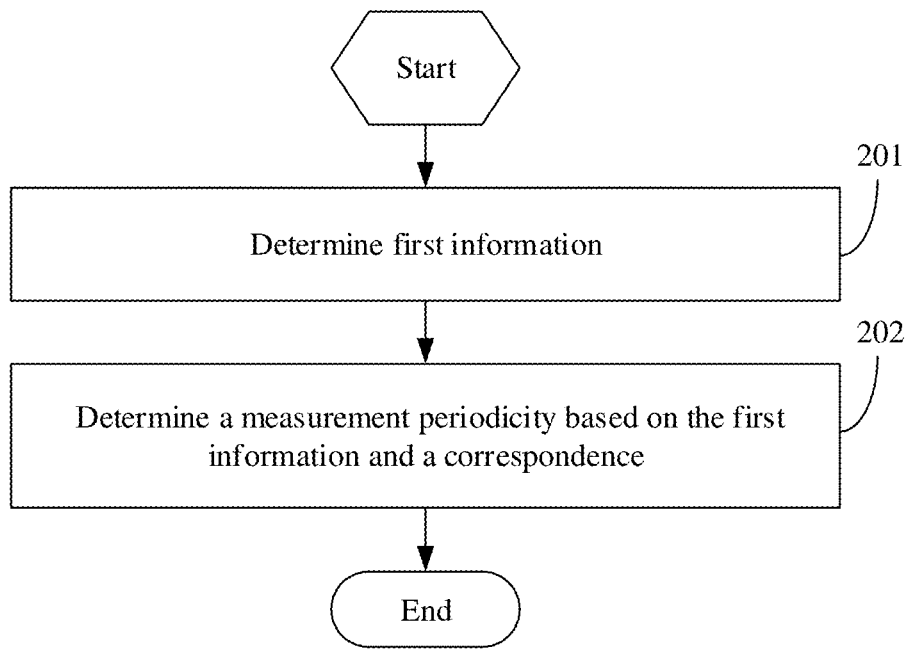
FIG. 2 is a flowchart of a communication method according to an embodiment of this disclosure.

Referring to FIG. 2, an embodiment of this disclosure provides a measurement method. The method may be executed by a terminal device. Specific steps are as follows:

Step 201: Determine first information, where
the first information includes at least one of the following:
a measurement quantity (measurement quantity) of a cell in which the terminal device is located that is obtained by the terminal device through measurement and information related to a movement velocity of the terminal device, where the measurement quantity indicates at least one of signal-to-noise ratio (Signal to Interference plus Noise Ratio, SINR), RSRP, or RSRQ; and
the cell in which the terminal device is located includes a serving cell or a camped cell.

The information related to the movement velocity of the terminal device may implicitly or explicitly indicate the movement velocity of the terminal device.

For example, a movement velocity of the terminal device between two moments may be calculated by using locations of the terminal device at the two moments in combination with a time difference between the two moments. The specific locations of the terminal device may be obtained by positioning through wireless fidelity (Wireless Fidelity, Wi-Fi), Bluetooth, global positioning system (Global Positioning System, GPS), or Beidou or 3rd Generation Partnership Project (3rd Generation Partnership Project, 3GPP) communications systems (for example, the 4th generation (4th generation, 4G) mobile communications system and the 5th generation (5th generation, 5G) mobile communications system).

For another example, the movement velocity of the terminal device is determined by using an acceleration sensor.

202. Determine a measurement periodicity based on the first information and a first correspondence.

The first correspondence indicates that the measurement periodicity is related to at least one of the measurement quantity and the movement velocity.

The first correspondence may be included in a mapping table. Optionally, for a form of the mapping table, refer to Table 3 to Table 7. Certainly, the form is not limited thereto.

TABLE 3

| One or more RSRPs | Measurement periodicity |
|---|---|
| <−90 dB | 2.56 s |
| −90 dB to −70 dB | 5.12 s |

The mapping table shown in Table 3 records a correspondence between one or more RSRPs and the measurement periodicity.

TABLE 4

| One or more RSRQs | Measurement periodicity |
|---|---|
| <−19 dB | 2.56 s |
| −19 dB to −4 dB | 5.12 s |

The mapping table shown in Table 4 records a correspondence between one or more RSRQs and the measurement periodicity.

TABLE 5

| One or more movement velocities | Measurement periodicity |
|---|---|
| >3 km/h | 2.56 s |
| <3 km/h | 5.12 s |

The mapping table shown in Table 5 records a correspondence between one or more movement velocities and the measurement periodicity.

TABLE 6

| One or more RSRPs | One or more movement velocities | Measurement periodicity |
|---|---|---|
| <−90 dB | >3 km/h | 2.56 s |
| −90 dB to −70 dB | ≤3 km/h | 5.12 s |

The mapping table shown in Table 6 records a correspondence between one or more RSRPs and one or more movement velocities, and the measurement periodicity.

TABLE 7

| One or more RSRQs | One or more movement velocities | Measurement periodicity |
|---|---|---|
| <−19 dB | >3 km/h | 2.56 s |
| −19 dB to −4 dB | ≤3 km/h | 5.12 s |

The mapping table shown in Table 7 records a correspondence between one or more RSRQs and one or more movement velocities, and the measurement periodicity.

It can be understood that a correspondence between SINR and the measurement periodicity is similar to the correspondences shown in the above tables, and is not further described herein.

In this embodiment of this disclosure, optionally, the measurement periodicity includes at least one of the following:

a measurement periodicity for the measurement quantity of the cell in which the terminal device is located, when the terminal device is in radio resource control (Radio Resource Control, RRC) idle (idle) or inactive (inactive) mode; and a measurement periodicity for a measurement quantity of an intra-frequency cell of the cell in which the terminal device is located, when the terminal device is in RRC connected mode.

In this embodiment of this disclosure, optionally, the measurement periodicity may be one or more discontinuous reception (Discontinuous Reception, DRX) cycles or an absolute value of time.

In this embodiment of this disclosure, optionally, after step 202, the method further includes: based on the determined measurement periodicity, measuring the measurement quantity of the cell in which the terminal device is located, or measuring the measurement quantity of the intra-frequency cell of the cell in which the terminal device is located.

In this embodiment of this disclosure, optionally, the first correspondence may be configured by a network device. Before step 201 or step 202, the method further includes: receiving the first correspondence from the network device.

In this embodiment of this disclosure, optionally, the first correspondence may be defined in a protocol, meaning that configuration by the network device may not be required.

In this embodiment of this disclosure, optionally, a configuration status of the first correspondence is related to a cell type of the cell in which the terminal device is located or related to a cell type of an intra-frequency cell of the cell in which the terminal device is located. For example, a first correspondence is configured for a macro cell, but no first correspondence is configured for a small cell. There are many types of small cells, for example, micro cells and pico cells.

For example, no first correspondence is configured for a macro cell; and a first correspondence is configured for a small cell. For another example, different first correspondences are configured respectively for a macro cell and a small cell.

In this embodiment of this disclosure, optionally, the measurement quantity of the cell in which the terminal device is located is obtained by the terminal device by measuring a synchronization signal, a demodulation reference signal (Demodulation Reference Signal, DMRS), or a channel state information reference signal (Channel State Information Reference Signal, CSI-RS) of the cell in which the terminal device is located. The synchronization signal includes a primary synchronization signal and/or an auxiliary synchronization signal.

In this embodiment of this disclosure, optionally, the first correspondence includes at least one of the following:

a greater measurement quantity corresponds to a longer measurement periodicity; and a lower movement velocity corresponds to a longer measurement periodicity.

That a greater measurement quantity corresponds to a longer measurement periodicity means at least one of the following:

a greater RSRP corresponds to a longer measurement periodicity;

a greater RSRQ corresponds to a longer measurement periodicity; and a greater SINR corresponds to a longer measurement periodicity.

In this embodiment of this disclosure, measurements performed by the terminal device can be reduced, thereby reducing energy consumption of the terminal device.

Figure 3:
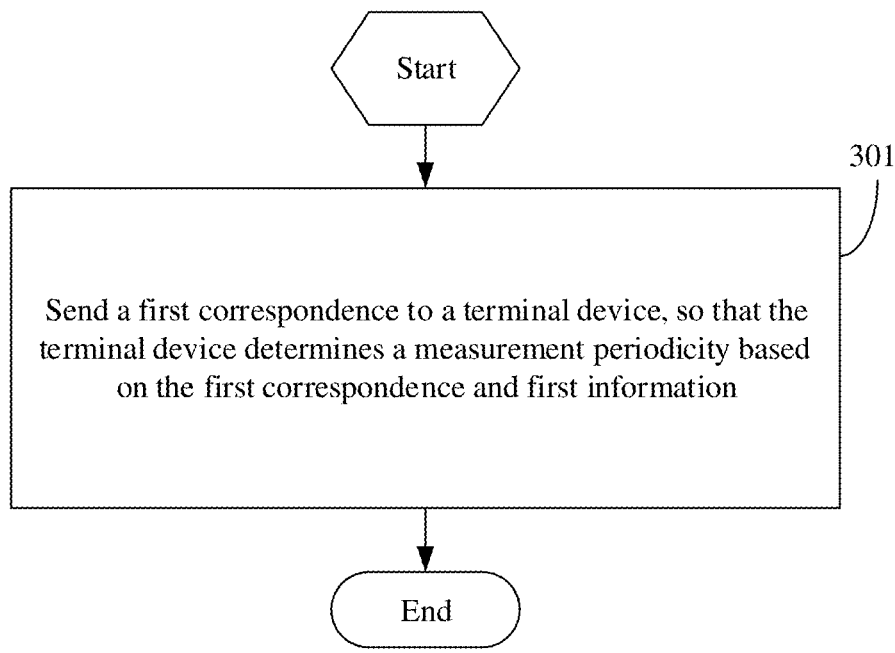
FIG. 3 is another flowchart of a communication method according to an embodiment of this disclosure.

Referring to FIG. 3, an embodiment of this disclosure further provides a measurement method. The method is executed by a network device, and includes steps as follows:

Step 301: Send a first correspondence to a terminal device, so that the terminal device determines a measurement periodicity based on the first correspondence and first information, where the first information includes at least one of the following:
a measurement quantity of a cell in which the terminal device is located that is obtained by the terminal device through measurement and information related to a movement velocity of the terminal device, where the measurement quantity indicates at least one of SINR, RSRP, and RSRQ; and the first correspondence indicates that the measurement periodicity is related to at least one of the measurement quantity and the movement velocity.

It should be understood that the first correspondence may be included in a mapping table. Optionally, for a form of the mapping table, refer to the foregoing Table 3 to Table 7. Certainly, the form is not limited thereto.

It should be noted that related content of the measurement quantity, the first correspondence, and the measurement periodicity in this embodiment of this disclosure are the same as the related content of the measurement quantity, the first correspondence, and the measurement periodicity in the measurement method embodiment shown in FIG. 2, and details are not described herein again.

In this embodiment of this disclosure, measurements performed by the terminal device can be reduced, thereby reducing energy consumption of the terminal device.

Figure 4:
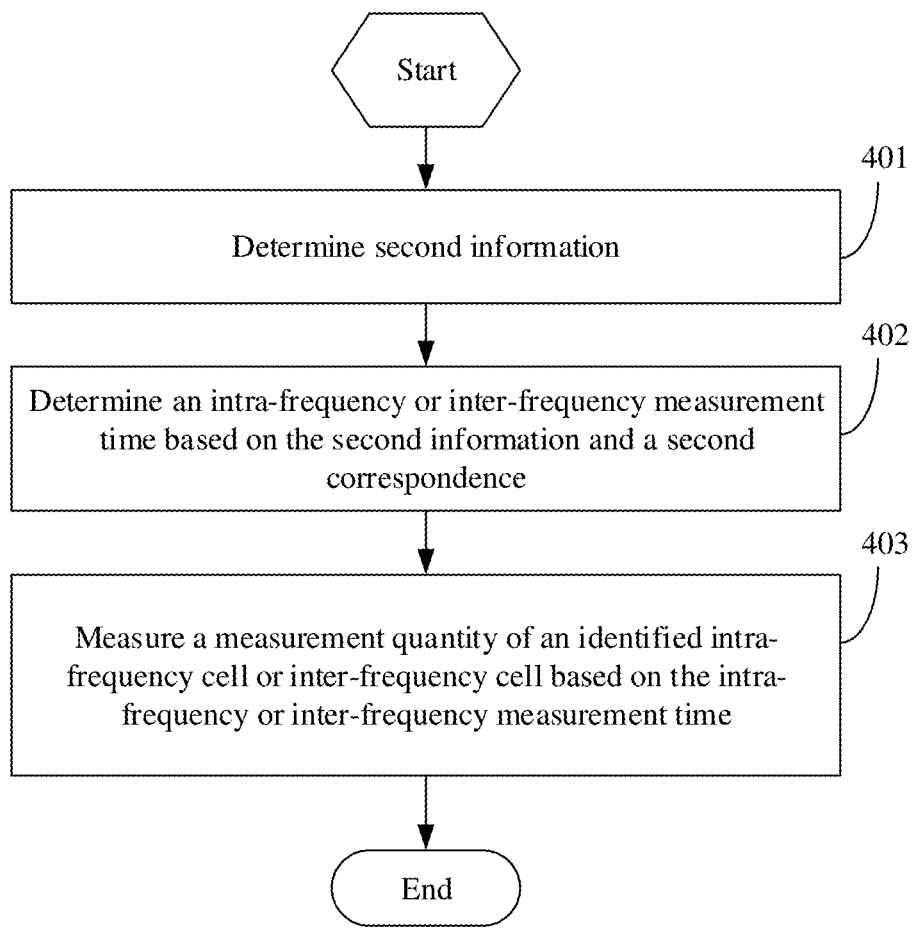
FIG. 4 is yet another flowchart of a communication method according to an embodiment of this disclosure.

Referring to FIG. 4, an embodiment of this disclosure provides a measurement method. The method is executed by a terminal device, and includes steps as follows:

Step 401: Determine second information, where the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and the cell in which the terminal device is located includes a serving cell or a camped cell.

Step 402: Determine an intra-frequency or inter-frequency measurement time based on the second information and a second correspondence, where the second correspondence indicates that the intra-frequency or inter-frequency measurement time is related to at least one of the measurement quantity and the movement velocity; and the intra-frequency or inter-frequency measurement time may include: an intra-frequency or inter-frequency detection time, an intra-frequency or inter-frequency measurement time, and an intra-frequency or inter-frequency evaluation time without limitation.

Step 403: Measure a measurement quantity of an identified intra-frequency cell or inter-frequency cell based on the intra-frequency or inter-frequency measurement time.

For example, the measurement quantity of the identified intra-frequency cell or inter-frequency cell is measured at least once in every interval of the intra-frequency or inter-frequency measurement time.

The second correspondence may be included in a mapping table. Optionally, for a form of the mapping table, refer to Table 8 to Table 12. Certainly, the form is not limited thereto.

TABLE 8

| One or more RSRPs | Intra-frequency or inter-frequency measurement time |
|---|---|
| <−90 dB | 2.56 s |
| −90 dB to −70 dB | 5.12 s |

The mapping table shown in Table 8 records a correspondence between one or more RSRPs and the intra-frequency or inter-frequency measurement time.

TABLE 9

| One or more RSRQs | Intra-frequency or inter-frequency measurement time |
|---|---|
| <−19 dB | 2.56 s |
| −19 dB to −4 dB | 5.12 s |

The mapping table shown in Table 9 records a correspondence between one or more RSRQs and the intra-frequency or inter-frequency measurement time.

TABLE 10

| One or more movement velocities | Intra-frequency or inter-frequency measurement time |
|---|---|
| >3 km/h | 2.56 s |
| ≤3 km/h | 5.12 s |

The mapping table shown in Table 10 records a correspondence between one or more movement velocities and the intra-frequency or inter-frequency measurement time.

TABLE 11

| One or more RSRPs | One or more movement velocities | Intra-frequency or inter-frequency measurement time |
|---|---|---|
| <−90 dB | >3 km/h | 2.56 s |
| −90 dB to −70 dB | ≤3 km/h | 5.12 s |

The mapping table shown in Table 11 records a correspondence between one or more RSRPs and one or more movement velocities, and the intra-frequency or inter-frequency measurement time.

TABLE 12

| One or more RSRQs | One or more movement velocities | Intra-frequency or inter-frequency measurement time |
|---|---|---|
| <−19 dB | >3 km/h | 2.56 s |
| −19 dB to −4 dB | ≤3 km/h | 5.12 s |

The mapping table shown in Table 12 records a correspondence between one or more RSRQs and one or more movement velocities, and the intra-frequency or inter-frequency measurement time.

It can be understood that a correspondence between SINR and the intra-frequency or inter-frequency measurement time is similar to the correspondences shown in the above tables, and is not further described herein.

In this embodiment of this disclosure, optionally, the second correspondence may be configured by a network device. Before step 401 or step 402, the method further includes: receiving the second correspondence from the network device.

In this embodiment of this disclosure, optionally, the second correspondence may be defined in a protocol, meaning that configuration by the network device may not be required.

In this embodiment of this disclosure, optionally, a configuration status of the second correspondence is related to a cell type of an intra-frequency cell or an inter-frequency cell of the cell in which the terminal device is located. For example, a second correspondence is configured for a macro cell, but no second correspondence is configured for a small cell. There are many types of small cells, for example, micro cells and pico cells.

For example, no second correspondence is configured for a macro cell; and a second correspondence is configured for a small cell. For another example, different second correspondences are configured respectively for a macro cell and a small cell.

In this embodiment of this disclosure, optionally, the measurement quantity of the cell in which the terminal device is located is obtained by the terminal device by measuring a synchronization signal, a DMRS, or a CSI-RS of the cell in which the terminal device is located.

In this embodiment of this disclosure, optionally, the second correspondence includes at least one of the following:

a greater measurement quantity corresponds to a longer intra-frequency or inter-frequency measurement periodicity; and a lower movement velocity corresponds to a longer intra-frequency or inter-frequency measurement periodicity.

That a greater measurement quantity corresponds to a longer intra-frequency or inter-frequency measurement periodicity includes at least one of the following:
- a greater RSRP corresponds to a longer intra-frequency or inter-frequency measurement periodicity;
- a greater RSRQ corresponds to a longer intra-frequency or inter-frequency measurement periodicity; and
- a greater SINR corresponds to a longer intra-frequency or inter-frequency measurement periodicity.

In this embodiment of this disclosure, measurements performed by the terminal device can be reduced, thereby reducing energy consumption of the terminal device.

Figure 5:
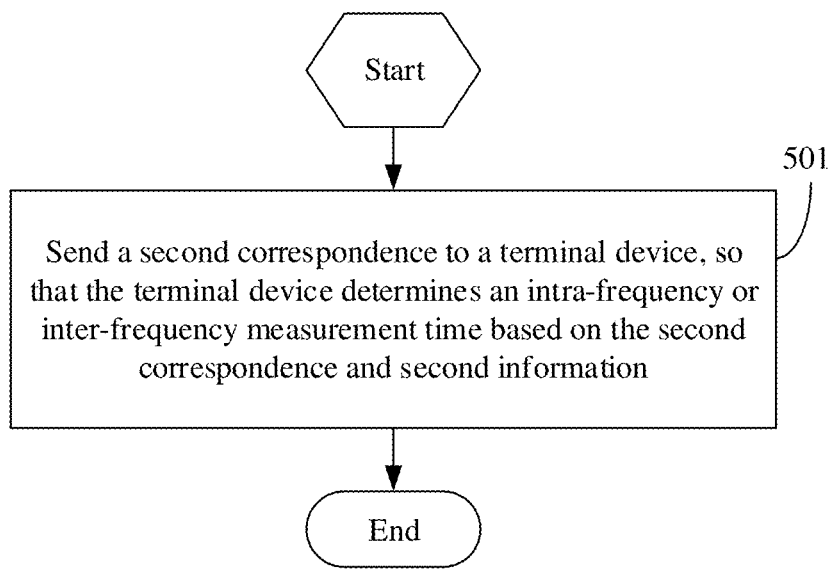
FIG. 5 is yet another flowchart of a communication method according to an embodiment of this disclosure.

Referring to FIG. 5, an embodiment of this disclosure provides a measurement method. The method is executed by a network device, and includes steps as follows:

Step 501: Send a second correspondence to a terminal device, so that the terminal device determines an intra-frequency or inter-frequency measurement time based on second information and the second correspondence, where
- the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and
- the second correspondence indicates that the intra-frequency or inter-frequency measurement time is related to at least one of the measurement quantity and the movement velocity.

It should be noted that related content of the second information, the measurement quantity, the second correspondence, and the intra-frequency or inter-frequency measurement time in this embodiment of this disclosure are the same as the related content of the second information, the measurement quantity, the first correspondence, and the intra-frequency or inter-frequency measurement time in the measurement method embodiment shown in FIG. 4, and details are not described herein again.

In this embodiment of this disclosure, measurements performed by the terminal device can be reduced, thereby reducing energy consumption of the terminal device.

Example 1

Optimization of Radio Resource Management (Radio Resource Management, RRM) Measurement for a Serving Cell (Serving Cell)

Step 1: A terminal device receives a first correspondence from a network device.

The first correspondence indicates that at least one of SINR, RSRP, RSRQ, and a movement velocity of the terminal device corresponds to a measurement periodicity.

It can be understood that step 1 is optional, the first correspondence may alternatively be defined in a protocol, meaning that configuration by the network device is not required.

It can be understood that a configuration status of the first correspondence is related to a type of a serving cell or an intra-frequency cell. For example, a first correspondence is configured for a macro cell, and no first correspondence is configured for a small cell. There are many types of small cells, for example, micro cells and pico cells.

For example, no first correspondence is configured for a macro cell; and a first correspondence is configured for a small cell. For another example, different first correspondences are configured respectively for a macro cell and a small cell.

Step 2: The terminal device determines a measurement periodicity based on the first correspondence and first information.

Optionally, the first information includes one or more of the following: one or more SINRs of a cell in which the terminal device is located that are obtained by the terminal device through measurement, one or more RSRPs of the cell in which the terminal device is located that are obtained by the terminal device through measurement, and one or more RSRQs of the cell in which the terminal device is located that are obtained by the terminal device through measurement, and information related to the movement velocity of the terminal device.

It can be understood that in the first correspondence, a different SINR, RSRP, RSRQ, or movement velocity of the terminal device corresponds to a different measurement periodicity. For example, a greater SINR, RSRP, or RSRQ corresponds to a longer measurement periodicity; and a lower movement velocity of the terminal device corresponds to a longer measurement periodicity.

It can be understood that the measurement periodicity may be N DRX cycles or an absolute value of time.

Referring to Table 13 to Table 15, three forms of the mapping table are illustrated without limitation.

TABLE 13

DRX cycle = 1280 ms is used as an example.

| RSRP interval (dB) | Serving cell measurement periodicity: N DRX cycles |
|---|---|
| <−90 | 2 |
| −90 to −70 | 4 |
| >−70 | 8 |

TABLE 14

DRX cycle = 640 ms is used as an example.

| RSRP interval (dB) | Serving cell measurement periodicity: N DRX cycles |
|---|---|
| <−90 | 4 (or 2.56 s) |
| −90 to −70 | 8 (or 5.12 s) |
| >−70 | 16 (or 10.24 s) |

TABLE 15 other DRX cycles are used as an example.

| RSRP interval (dB) | Serving cell measurement periodicity (second (s)) |
|---|---|
| <−90 | 2.56 s |
| −90 to −70 | 5.12 s |
| >−70 | 10.24 s |

The mapping tables shown in Table 13 to Table 15 include a correspondence between the RSRP interval and the measurement periodicity. It can be understood that the mapping tables may alternatively include a correspondence between the SINR, RSRQ, or movement velocity and the measurement periodicity, or the mapping tables may include a correspondence between at least two of the SINR, RSRP, RSRQ, and movement velocity and the measurement periodicity. Forms of the mapping tables are similar to those of Table 13 to Table 15, and details are not described herein again.

Example 2

Optimization of Measurements of Intra-Frequency or Inter-Frequency NR Cells (Measurements of Intra-Frequency/Inter-Frequency NR Cells)

Step 1: A terminal device receives a second correspondence from a network device.

The second correspondence indicates that at least one of SINR, RSRP, RSRQ, and a movement velocity of the terminal device corresponds to an intra-frequency or inter-frequency measurement time.

The intra-frequency or inter-frequency measurement time correspondingly includes: an intra-frequency or inter-frequency detection time, an intra-frequency or inter-frequency measurement time, and an intra-frequency or inter-frequency evaluation time.

It can be understood that step 1 is optional, the second correspondence may alternatively be defined in a protocol, meaning that configuration by the network device is not required.

It can be understood that a configuration status of the second correspondence may be related to a cell type. For example, a second correspondence is configured for a macro cell, and no second correspondence is configured for a small cell. There are many type of small cells, for example, micro cells and pico cells.

For example, no second correspondence is configured for a macro cell; and a second correspondence is configured for a small cell. For another example, different second correspondences are configured respectively for a macro cell and a small cell.

Step 2: The terminal device determines an intra-frequency or inter-frequency measurement time based on the second correspondence and second information.

The second information includes one or more of the following: one or more SINRs of a cell in which the terminal device is located that are obtained by the terminal device through measurement, one or more RSRPs of the cell in which the terminal device is located that are obtained by the terminal device through measurement, and one or more RSRQs of the cell in which the terminal device is located that are obtained by the terminal device through measurement, and information related to the movement velocity of the terminal device.

In Table 16, that one or more RSRP values measured by the terminal device in the last one or more measurements fall in an interval of −90 dB to 70 dB is used as an example.

TABLE 16

| DRX cycle length [s] | $T_{detect, NR\_Intra}$ [s] (number of DRX cycles) | $T_{measure, NR\_Intra}$ [s] (number of DRX cycles) | $T_{evaluate, NR\_intra}$ [s] (number of DRX cycles) |
|---|---|---|---|
| 0.32 | 11.52 × N1 [36 × N1] | 2.56 × N1 (8 × N1) | 5.12 × N1 (16 × N1) |
| 0.64 | 17.92 × N1 [28 × N1] | 2.56 × N1 (4 × N1) | 5.12 × N1 (8 × N1) |
| 1.28 | 32 × N1 [25 × N1] | 2.56 × N1 (2 × N1) | 6.4 × N1 (5 × N1) |
| 2.56 | 33.28 × N1 [23 × N1] | 5.12 × N1 (2 × N1) | 7.68 × N1 (3 × N1) |

Note:
For a frequency range 1 (frequency range 1), N1 = 1; for a frequency range 2 (frequency range 2), the value of N1 is to be determined.

See Table 17 for another form of mapping table. In Table 17, that one or more RSRP values measured by the terminal device in the last one or more measurements are less than −90 dB is used as an example.

TABLE 17

| DRX cycle length [s] | $T_{detect, NR\_Intra}$ [s] (number of DRX cycles) | $T_{measure, NR\_Intra}$ [s] (number of DRX cycles) | $T_{evaluate, NR\_intra}$ [s] (number of DRX cycles) |
|---|---|---|---|
| 0.32 | 11.52 × N1 [36 × N1] | 1.28 × N1 (4 × N1) | 5.12 × N1 (16 × N1) |
| 0.64 | 17.92 × N1 [28 × N1] | 1.28 × N1 (2 × N1) | 5.12 × N1 (8 × N1) |
| 1.28 | 32 × N1 [25 × N1] | 1.28 × N1 (1 × N1) | 6.4 × N1 (5 × N1) |
| 2.56 | 33.28 × N1 [23 × N1] | 2.56 × N1 (1 × N1) | 7.68 × N1 (3 × N1) |

Note:
For a frequency range 1 (frequency range 1), N1 = 1; for a frequency range 2 (frequency range 2), the value of N1 is to be determined.

It can be understood that the mapping tables in Table 16 and Table 17 include the RSRP. The mapping tables may alternatively include the SINR, RSRQ, or movement velocity, or the mapping tables include at least two of the SINR, RSRP, RSRQ, and movement velocity. Forms of the mapping tables are similar to those of Table 16 and Table 17, and details are not described herein again.

It can be understood that, in mapping forms shown in FIG. 16 and FIG. 17, not only $T_{measure, NR\_Intra}$ is related to the one or more RSRPs, RSRQs, or movement velocities measured by the terminal device in the last one or more measurements, but $T_{detect, NR\_Intra}$ and $T_{evaluate, NR\_intra}$ may also be related to the one or more SINRs, RSRPs, RSRQs, or movement velocities measured by the terminal device in the last one or more measurements.

Example 3

Optimization of Measurements of Intra-Frequency NR Cells (Measurements of Intra-Frequency NR Cells) in RRC Connected (RRC_CONNECTED) Mode Step 1: A terminal device receives a first correspondence from a network device.

The first correspondence indicates that at least one of SINR, RSRP, RSRQ, and a movement velocity of the terminal device corresponds to a measurement periodicity for intra-frequency measurements (intra frequency measurement) in RRC_CONNECTED mode.

It can be understood that step 1 is optional, the first correspondence may alternatively be defined in a protocol, meaning that configuration by the network device is not required.

It can be understood that a configuration status of the first correspondence may be related to a cell type. For example, a first correspondence is configured for a macro cell, and no first correspondence is configured for a small cell. There are many types of small cells, for example, micro cells and pico cells.

For example, no first correspondence is configured for a macro cell; and a first correspondence is configured for a small cell. For another example, different first correspondences are configured respectively for a macro cell and a small cell.

Step 2: The terminal device determines a measurement periodicity based on the first correspondence and first information.

The first information includes one or more of the following: one or more SINRs of a cell in which the terminal device is located that are obtained by the terminal device through measurement, one or more RSRPs of the cell in which the terminal device is located that are obtained by the terminal device through measurement, and one or more RSRQs of the cell in which the terminal device is located that are obtained by the terminal device through measurement, and information related to the movement velocity of the terminal device.

It can be understood that in the first correspondence, a different SINR, RSRP, RSRQ, or movement velocity of the terminal device corresponds to a different measurement periodicity. For example, a greater SINR, RSRP, or RSRQ corresponds to a longer measurement periodicity; and a lower movement velocity of the terminal device corresponds to a longer measurement periodicity.

It can be understood that the measurement periodicity for the serving cell may be N DRX cycles or an absolute value of time.

An embodiment of this disclosure further provides a terminal device. Because the principle for the terminal device to resolve the problem is similar to that of the measurement method in the embodiments of this disclosure, for the implementation of the terminal device, reference may be made to the implementation of the method, and details are not repeated.

Figure 6:
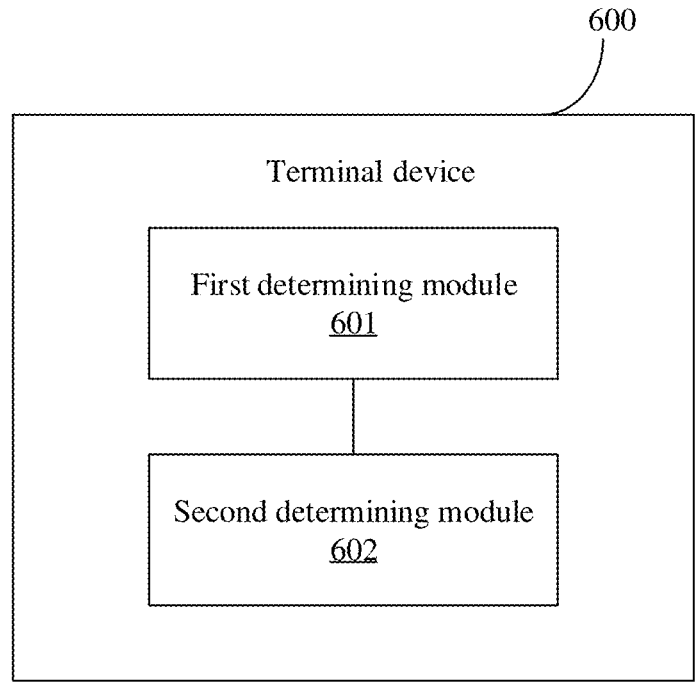
FIG. 6 is a structural diagram of a terminal device according to an embodiment of this disclosure.

Referring to FIG. 6, an embodiment of this disclosure provides a terminal device, where the terminal device 600 includes:
- a first determining module 601, configured to determine first information, where the first information includes at least one of the following: a measurement quantity of a cell in which the terminal device is located that is obtained by the terminal device through measurement and information related to a movement velocity of the terminal device, where
- the measurement quantity indicates at least one of SINR, RSRP, and RSRQ; and
- a second determining module 602, configured to determine a measurement periodicity based on the first information and a first correspondence, where the first correspondence indicates that the measurement periodicity is related to at least one of the measurement quantity and the movement velocity.

In this embodiment of this disclosure, optionally, the measurement periodicity includes at least one of the following:
- a measurement periodicity for the measurement quantity of the cell in which the terminal device is located, when the terminal device is in radio resource control RRC idle idle or inactive inactive mode; and
- a measurement periodicity for a measurement quantity of an intra-frequency cell of the cell in which the terminal device is located, when the terminal device is in RRC connected mode.

In this embodiment of this disclosure, optionally, the measurement periodicity is one or more discontinuous reception DRX cycles or an absolute value of time.

In this embodiment of this disclosure, optionally, the first correspondence is configured by a network device or defined in a protocol.

In this embodiment of this disclosure, optionally, a configuration status of the first correspondence is related to a cell type of the cell in which the terminal device is located, or a configuration status of the first correspondence is related to a cell type of an intra-frequency cell of the cell in which the terminal device is located.

In this embodiment of this disclosure, optionally, the measurement quantity of the cell in which the terminal device is located is obtained by the terminal device by measuring a synchronization signal, a DMRS, or a CSI-RS of the cell in which the terminal device is located.

In this embodiment of this disclosure, optionally, the first correspondence includes at least one of the following:
- a greater measurement quantity corresponds to a longer measurement periodicity; and
- a lower movement velocity corresponds to a longer measurement periodicity.

The terminal device provided in this embodiment of this disclosure may execute the above method embodiment, with a similar implementation principle and similar technical effects. Details are not repeated herein in this embodiment.

An embodiment of this disclosure further provides a network device. Because the principle for the network device to resolve the problem is similar to that of the measurement method in the embodiments of this disclosure, for the implementation of the network device, reference may be made to the implementation of the method, and details are not repeated.

Figure 7:
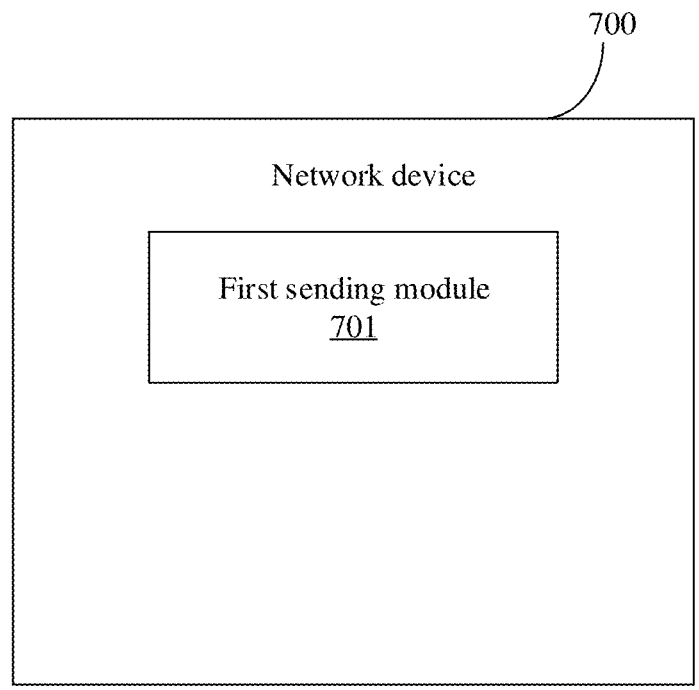
FIG. 7 is a structural diagram of a network device according to an embodiment of this disclosure.

Referring to FIG. 7, an embodiment of this disclosure provides a network device, where the network device 700 includes:
- a first sending module 701, configured to send a first correspondence to a terminal device, so that the terminal device determines a measurement periodicity based on the first correspondence and first information, where
- the first information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and
- the first correspondence indicates that the measurement periodicity is related to at least one of the measurement quantity and the movement velocity.

In this embodiment of this disclosure, optionally, the measurement periodicity includes at least one of the following:
- a measurement periodicity for the measurement quantity of the cell in which the terminal device is located, when the terminal device is in radio resource control RRC idle idle or inactive inactive mode; and
- a measurement periodicity for a measurement quantity of an intra-frequency cell of the cell in which the terminal device is located, when the terminal device is in RRC connected mode.

In this embodiment of this disclosure, optionally, the measurement periodicity may be one or more DRX cycles or an absolute value of time.

In this embodiment of this disclosure, optionally, the measurement quantity of the cell in which the terminal device is located is obtained by the terminal device by measuring a synchronization signal, a DMRS, or a CSI-RS of the cell in which the terminal device is located.

In this embodiment of this disclosure, optionally, the first correspondence includes at least one of the following:
 a greater measurement quantity corresponds to a longer measurement periodicity; and
 a lower movement velocity corresponds to a longer measurement periodicity.

In this embodiment of this disclosure, optionally, a configuration status of the first correspondence is related to a cell type of the cell in which the terminal device is located, or a configuration status of the first correspondence is related to a cell type of an intra-frequency cell of the cell in which the terminal device is located.

The network device provided in this embodiment of this disclosure may execute the above method embodiment, with a similar implementation principle and similar technical effects. Details are not repeated herein in this embodiment.

An embodiment of this disclosure further provides a terminal device. Because the principle for the terminal device to resolve the problem is similar to that of the measurement method in the embodiments of this disclosure, for the implementation of the terminal device, reference may be made to the implementation of the method, and details are not repeated.

Figure 8:
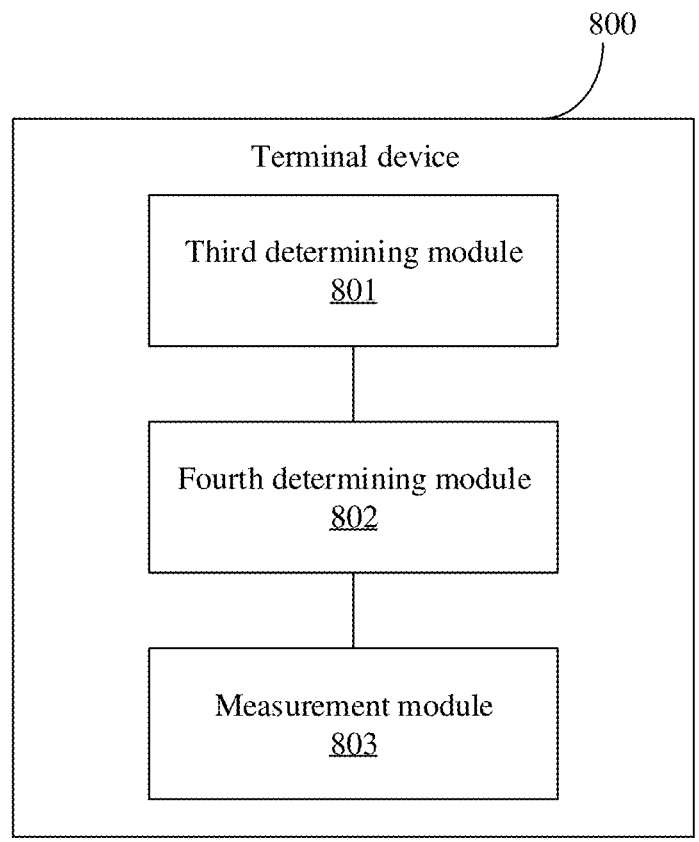
FIG. 8 is another structural diagram of a terminal device according to an embodiment of this disclosure.

Referring to FIG. 8, an embodiment of this disclosure provides a terminal device, where the terminal device 800 includes:
 a third determining module 801, configured to determine second information, where the second information includes at least one of the following: a measurement quantity of a cell in which the terminal device is located that is obtained by the terminal device through measurement and information related to a movement velocity of the terminal device, where
 the measurement quantity indicates at least one of SINR, RSRP, and RSRQ;
 a fourth determining module 802, configured to determine an intra-frequency or inter-frequency measurement time based on the second information and a second correspondence, where the second correspondence indicates that the intra-frequency or inter-frequency measurement time is related to at least one of the measurement quantity and the movement velocity; and
 a measurement module 803, configured to measure a measurement quantity of an identified intra-frequency cell or inter-frequency cell based on the intra-frequency or inter-frequency measurement time.

For example, the measurement module 803 is configured to measure a measurement quantity of an identified intra-frequency cell or inter-frequency cell at least once in every interval the intra-frequency or inter-frequency measurement time.

In this embodiment of this disclosure, optionally, the second correspondence is configured by a network device or defined in a protocol.

In this embodiment of this disclosure, optionally, a configuration status of the second correspondence is related to a cell type of an intra-frequency cell or an inter-frequency cell of the cell in which the terminal device is located.

In this embodiment of this disclosure, optionally, the measurement quantity of the cell in which the terminal device is located is obtained by the terminal device by measuring a synchronization signal, a DMRS, or a CSI-RS of the cell in which the terminal device is located.

In this embodiment of this disclosure, optionally, the second correspondence includes at least one of the following:
 a greater measurement quantity corresponds to a longer intra-frequency or inter-frequency measurement periodicity; and
 a lower movement velocity corresponds to a longer intra-frequency or inter-frequency measurement periodicity.

The terminal device provided in this embodiment of this disclosure may execute the above method embodiment, with a similar implementation principle and similar technical effects. Details are not repeated herein in this embodiment.

An embodiment of this disclosure further provides a network device. Because the principle for the network device to resolve the problem is similar to that of the measurement method in the embodiments of this disclosure, for the implementation of the network device, reference may be made to the implementation of the method, and details are not repeated.

Figure 9:
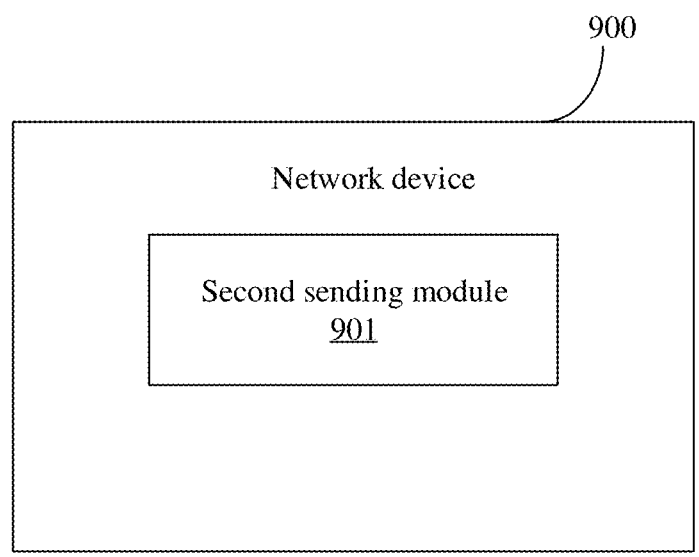
FIG. 9 is another structural diagram of a network device according to an embodiment of this disclosure.

Referring to FIG. 9, an embodiment of this disclosure provides a network device, where the network device 900 includes:
 a second sending module 901, configured to send a second correspondence to a terminal device, so that the terminal device determines an intra-frequency or inter-frequency measurement time based on second information and the second correspondence, where
 the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and
 the second correspondence indicates that the intra-frequency or inter-frequency measurement time is related to at least one of the measurement quantity and the movement velocity.

The network device provided in this embodiment of this disclosure may execute the above method embodiment, with a similar implementation principle and similar technical effects. Details are not repeated herein in this embodiment.

Figure 10:
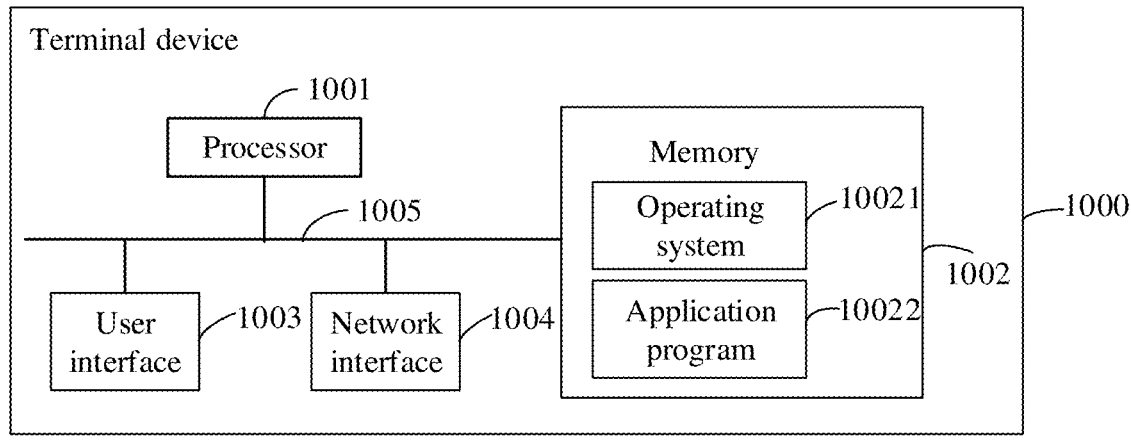
FIG. 10 is yet another structural diagram of a terminal device according to an embodiment of this disclosure.

As shown in FIG. 10, a terminal device 1000 shown in FIG. 10 includes at least one processor 1001, a memory 1002, at least one network interface 1004, and a user interface 1003. The components in the terminal device 1000 are coupled together through a bus system 1005. It may be understood that the bus system 1005 is used to implement connection and communication between these components. In addition to a data bus, the bus system 1005 further includes a power bus, a control bus, and a status signal bus. However, for clarity of description, various buses are marked as the bus system 1005 in FIG. 10.

The user interface 1003 may include a display, a keyboard, or a pointing device (for example, a mouse, a trackball (trackball)), a touch panel, or a touchscreen.

It can be understood that the memory 1002 in this embodiment of this disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 1002 of the system and the method described in the embodiments of this disclosure is intended to include but not be limited to these and any other applicable types of memories.

In some embodiments, the memory 1002 stores the following elements: executable modules or data structures, or a subset thereof, or an extended set thereof: an operating system 10021 and an application program 10022.

The operating system 10021 includes various system programs, such as a framework layer, a core library layer, and a driver layer, for implementing various basic services and processing hardware-based tasks. The application program 10022 includes various application programs, such as a media player (Media Player) and a browser (Browser), which are used to implement various application services. A program for implementing the method in the embodiments of this disclosure may be included in the application program 10022.

In an embodiment of this disclosure, when a program or an instruction stored in the memory 1002, which may be a program or an instruction stored in the application program 10022, is called for execution, the following steps are implemented: determining first information, where the first information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and determining a measurement periodicity based on the first information and a first correspondence, where the first correspondence indicates that the measurement periodicity is related to at least one of the measurement quantity and the movement velocity of the terminal device.

In another embodiment of this disclosure, when a program or an instruction stored in the memory 1002, which may be a program or an instruction stored in the application program 10022, is called for execution, the following steps are implemented: determining second information, where the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; determining an intra-frequency or inter-frequency measurement time based on the second information and a second correspondence, where the second correspondence indicates that the intra-frequency or inter-frequency measurement time is related to at least one of the measurement quantity and the movement velocity of the terminal device; and measuring a measurement quantity of an identified intra-frequency cell or inter-frequency cell based on the intra-frequency or inter-frequency measurement time.

The terminal device provided in this embodiment of this disclosure may execute the above method embodiment, with a similar implementation principle and similar technical effects. Details are not repeated herein in this embodiment.

Figure 11:
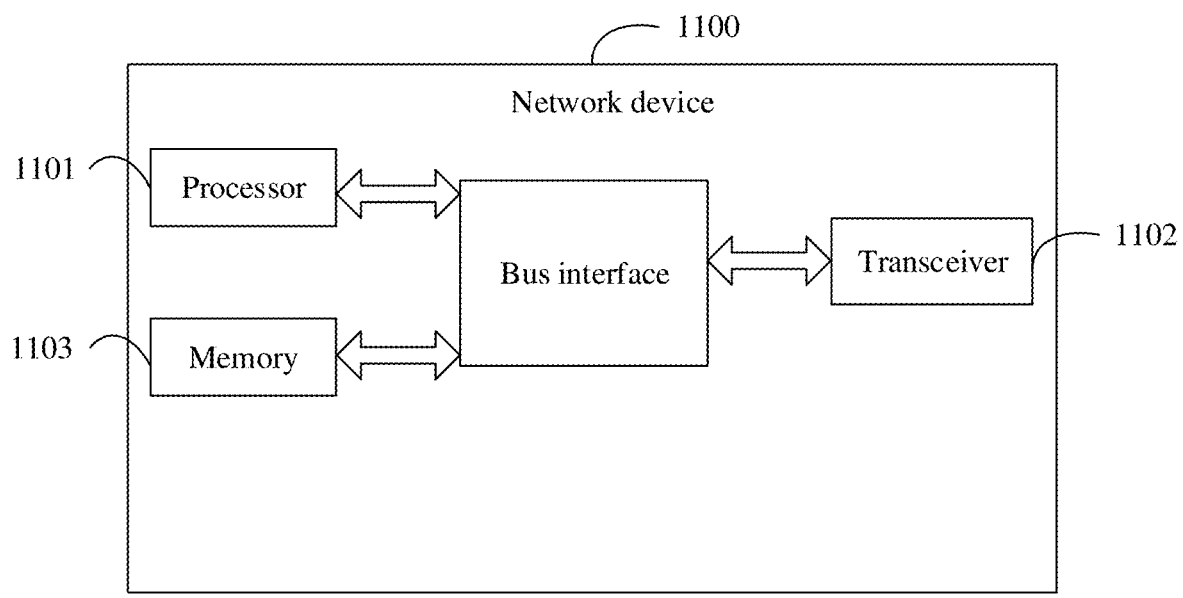
FIG. 11 is yet another structural diagram of a network device according to an embodiment of this disclosure.

FIG. 11 is a structural diagram of a network device applied in an embodiment of this disclosure. As shown in FIG. 11, the network device 1100 includes a processor 1101, a transceiver 1102, a memory 1103, and a bus interface.

In an embodiment of this disclosure, the network device 1100 further includes a computer program stored in the memory 1103 and capable of running on the processor 1101. When the computer program is executed by the processor 1101, the following steps are implemented: sending first correspondence to a terminal device, so that the terminal device determines a measurement periodicity based on the first correspondence and first information, where the first information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and the first correspondence indicates that the measurement periodicity is related to at least one of the measurement quantity and the movement velocity of the terminal device.

In another embodiment of this disclosure, the network device 1100 further includes a computer program stored in the memory 1103 and capable of running on the processor 1101. When the computer program is executed by the processor 1101, the following steps are implemented: sending second correspondence to a terminal device, so that the terminal device determines an intra-frequency or inter-frequency measurement time based on the second correspondence and second information, where the second information includes at least one of the following: a measurement quantity of a cell in which the terminal device is located that is obtained by the terminal device through measurement and information related to a movement velocity of the terminal device, where the measurement quantity indicates at least one of SINR, RSRP, and RSRQ; and the second correspondence indicates that the an intra-frequency or inter-frequency measurement time is related to at least one of the measurement quantity and the movement velocity of the terminal device.

In FIG. 11, a bus architecture may include any quantity of interconnected buses and bridges, and may connect together various circuits of one or more processors represented by the processor 1101 and a memory represented by the memory 1103. The bus architecture may further connect various other circuits such as peripheral device, voltage stabilizer, and power management circuits. These are well known in the art, and therefore are not further described in this specification. The bus interface provides interfaces. The transceiver 1102 may be a plurality of elements, including a transmitter and a receiver, and provides units configured to communicate with various other apparatuses over a transmission medium.

The processor 1101 is responsible for management of the bus architecture and general processing, and the memory 1103 may store data for use by the processor 1101 when the processor 1101 performs an operation.

The network device provided in this embodiment of this disclosure may execute the above method embodiment, with a similar implementation principle and similar technical effects. Details are not repeated herein in this embodiment.

The method or algorithmic steps described in combination with the content disclosed in this disclosure may be implemented by hardware, or may be implemented by a processor executing software instructions. The software instructions may consist of corresponding software modules. The software modules may be stored in a RAM, a flash memory, a ROM, an EPROM, an EEPROM, a register, a hard disk, a removable hard disk, a CD-ROM, or a storage medium of any other form known in the art. For example, a storage medium is coupled to the processor, enabling the processor to read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the disclosure may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The objectives, technical solutions, and benefits of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions in this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams.

These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, persons skilled in the art can make various modifications and variations to the embodiments of this disclosure without departing from the spirit and scope of this disclosure. This disclosure is intended to cover these modifications and variations to the embodiments of this disclosure provided that they fall within the protection scope defined by the claims of this disclosure and their equivalent technologies.

What is claimed is:

1. A measurement method, applied to a terminal device, wherein the method comprises:
   determining first information, wherein the first information comprises a measurement quantity of a cell in which the terminal device is located and information related to a movement velocity of the terminal device, wherein the measurement quantity is obtained by the terminal device through measurement, and the measurement quantity indicates at least one of signal-to-noise ratio (SINR), reference signal received power (RSRP), and reference signal received quality (RSRQ); and
   determining a measurement periodicity based on the first information and a first correspondence, wherein the first correspondence indicates that the measurement periodicity is related to the measurement quantity and the measurement velocity information related to different movement velocities of the terminal device and different measurement quantities of a cell in which the terminal device is located corresponds to different measurement periodicities respectively; wherein
   a configuration status of the first correspondence is related to a cell type of the cell in which the terminal device is located; or
   a configuration status of the first correspondence is related to a cell type of an intra-frequency cell of the cell in which the terminal device is located.

2. The method according to claim 1, wherein the measurement periodicity comprises at least one of the following:
   a measurement periodicity for the measurement quantity of the cell in which the terminal device is located, when the terminal device is in radio resource control (RRC) idle or inactive state; and a measurement periodicity for a measurement quantity of an intra-frequency cell of the cell in which the terminal device is located, when the terminal device is in RRC connected mode.

3. The method according to claim 1, wherein the measurement periodicity is:
one or more discontinuous reception (DRX) cycles, or an absolute value of time.

4. The method according to claim 1, wherein the measurement quantity of the cell in which the terminal device is located is obtained by the terminal device by measuring a synchronization signal, a demodulation reference signal (DMRS), or a channel state information reference signal (CSI-RS) of the cell in which the terminal device is located.

5. The method according to claim 1, wherein the first correspondence comprises at least one of the following:
a greater measurement quantity corresponds to a longer measurement periodicity; and
a lower movement velocity corresponds to a longer measurement periodicity.

6. The method according to claim 1, wherein before determining the measurement periodicity based on the first information and the first correspondence, the method further comprises:
receiving the first correspondence from a network device.

7. A measurement method, applied to a terminal device, wherein the method comprises:
determining second information, wherein the second information comprises a measurement quantity of a cell in which the terminal device is located that is obtained by the terminal device through measurement and information related to a movement velocity of the terminal device, wherein the measurement quantity indicates at least one of SINR, RSRP, and RSRQ;
determining an intra-frequency or inter-frequency measurement time based on the second information and a second correspondence, wherein the second correspondence indicates that the intra-frequency or inter-frequency measurement time is related to of the measurement quantity and the movement velocity information related to different movement velocities of the terminal and different measurement quantities of a cell in which the terminal device is located corresponds to different intra-frequency or inter-frequency measurement times respectively, and
measuring a measurement quantity of an identified intra-frequency cell or inter-frequency cell based on the intra-frequency or inter-frequency measurement time; wherein
a configuration status of the second correspondence is related to a cell type of an intra-frequency or inter-frequency cell of the cell in which the terminal device is located.

8. The method according to claim 7, wherein the measurement quantity of the cell in which the terminal device is located is obtained by the terminal device by measuring a synchronization signal, a DMRS, or a CSI-RS of the cell in which the terminal device is located.

9. The method according to claim 7, wherein the second correspondence comprises at least one of the following:
a greater measurement quantity corresponds to a longer intra-frequency or inter-frequency measurement time; and
a lower movement velocity corresponds to a longer intra-frequency or inter-frequency measurement time.

10. The method according to claim 7, wherein before determining the intra-frequency or inter-frequency measurement time based on the second information and the second correspondence, the method further comprises:
receiving the second correspondence from a network device.

11. A terminal device, comprising a processor, a memory, and a computer program stored in the memory and capable of running on the processor, wherein the computer program, when executed by the processor, causes the terminal device to perform following steps:
determining first information, wherein the first information comprises a measurement quantity of a cell in which the terminal device is located and information related to a movement velocity of the terminal device, wherein the measurement quantity is obtained by the terminal device through measurement, and the measurement quantity indicates at least one of signal-to-noise ratio (SINR), reference signal received power (RSRP), and reference signal received quality (RSRQ); and
determining a measurement periodicity based on the first information and a first correspondence, wherein the first correspondence indicates that the measurement periodicity is related to the measurement quantity and the measurement velocity information related to different movement velocities of the terminal device and different measurement quantities of a cell in which the terminal device is located corresponds to different measurement periodicities respectively; wherein
a configuration status of the first correspondence is related to a cell type of the cell in which the terminal device is located; or a configuration status of the first correspondence is related to a cell type of an intra-frequency cell of the cell in which the terminal device is located;
or, the computer program, when executed by the processor, causes the terminal device to perform following steps:
determining second information, wherein the second information comprises a measurement quantity of a cell in which the terminal device is located that is obtained by the terminal device through measurement and information related to a movement velocity of the terminal device, wherein the measurement quantity indicates at least one of SINR, RSRP, and RSRQ;
determining an intra-frequency or inter-frequency measurement time based on the second information and a second correspondence, wherein the second correspondence indicates that the intra-frequency or inter-frequency measurement time is related to the measurement quantity and the movement velocity information related to different movement velocities of the terminal device and different measurement quantities of a cell in which the terminal device is located corresponds to different intra-frequency or inter-frequency measurement times respectively, and
measuring a measurement quantity of an identified intra-frequency cell or inter-frequency cell based on the intra-frequency or inter-frequency measurement time; wherein
a configuration status of the second correspondence is related to a cell type of an intra-frequency or inter-frequency cell of the cell in which the terminal device is located.

12. The terminal device according to claim 11, wherein the measurement periodicity comprises at least one of the following:
  a measurement periodicity for the measurement quantity of the cell in which the terminal device is located, when the terminal device is in radio resource control (RRC) idle or inactive state; and
  a measurement periodicity for a measurement quantity of an intra-frequency cell of the cell in which the terminal device is located, when the terminal device is in RRC connected mode.

13. The terminal device according to claim 11, wherein the measurement periodicity is: one or more discontinuous reception (DRX) cycles, or an absolute value of time.

14. The terminal device according to claim 11, wherein the measurement quantity of the cell in which the terminal device is located is obtained by the terminal device by measuring a synchronization signal, a demodulation reference signal (DMRS), or a channel state information reference signal (CSI-RS) of the cell in which the terminal device is located.

15. The terminal device according to claim 11, wherein the first correspondence comprises at least one of the following:
  a greater measurement quantity corresponds to a longer measurement periodicity; and
  a lower movement velocity corresponds to a longer measurement periodicity;
  or, the second correspondence comprises at least one of the following:
  a greater measurement quantity corresponds to a longer intra-frequency or inter-frequency measurement time; and
  a lower movement velocity corresponds to a longer intra-frequency or inter-frequency measurement time.

16. The terminal device according to claim 11, wherein the computer program, when executed by the processor, further causes the terminal device to perform:
  receiving the first correspondence from a network device, before determining the measurement periodicity based on the first information and the first correspondence.

17. The terminal device according to claim 11, wherein the computer program, when executed by the processor, further causes the terminal device to perform:
  receiving the second correspondence from a network device, before determining the intra-frequency or inter-frequency measurement time based on the second information and the second correspondence.

* * * * *